J. C. VAN BERKEL.
SLICING MACHINE.
APPLICATION FILED MAY 12, 1916.
1,236,791.
Patented Aug. 14, 1917.
2 SHEETS—SHEET 1.
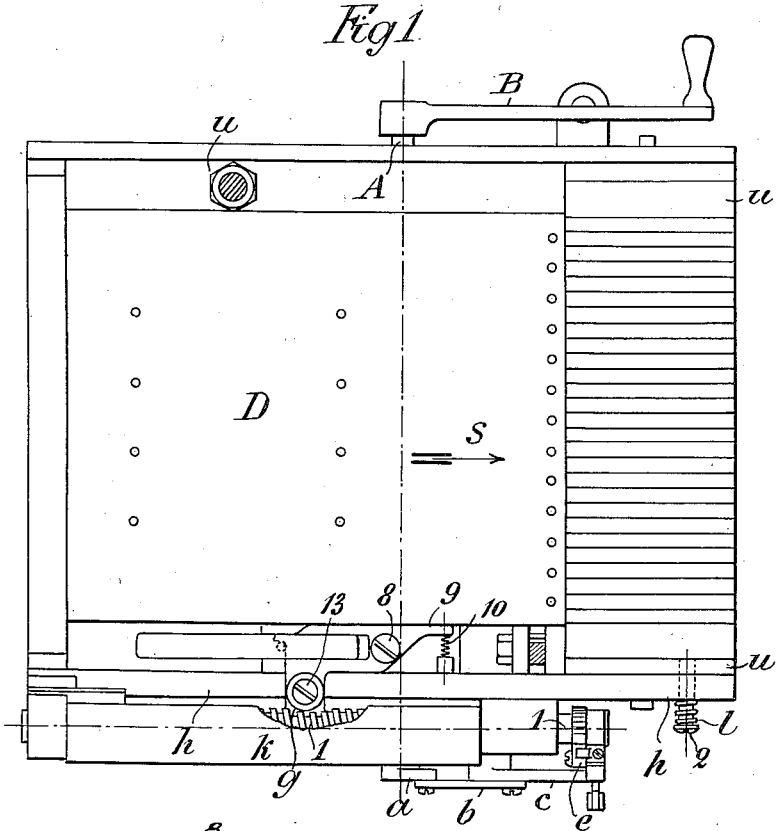
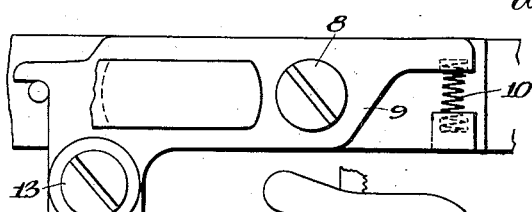
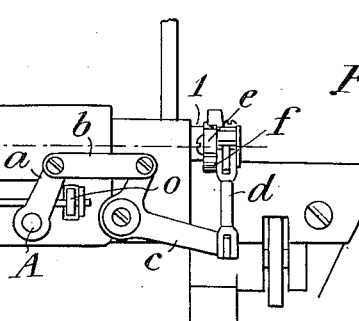
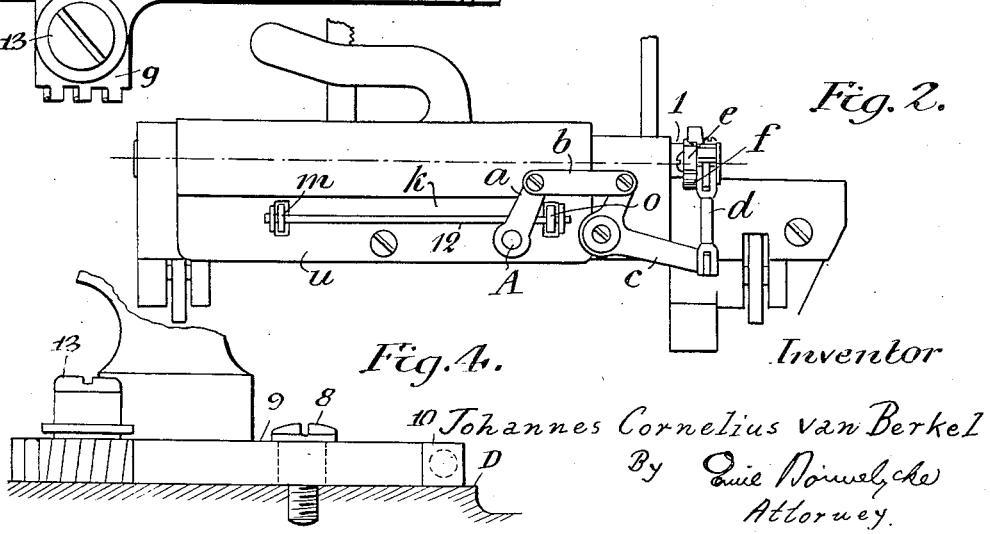
Inventor
Johannes Cornelius van Berkel
By Emil Bouwelycke
Attorney.

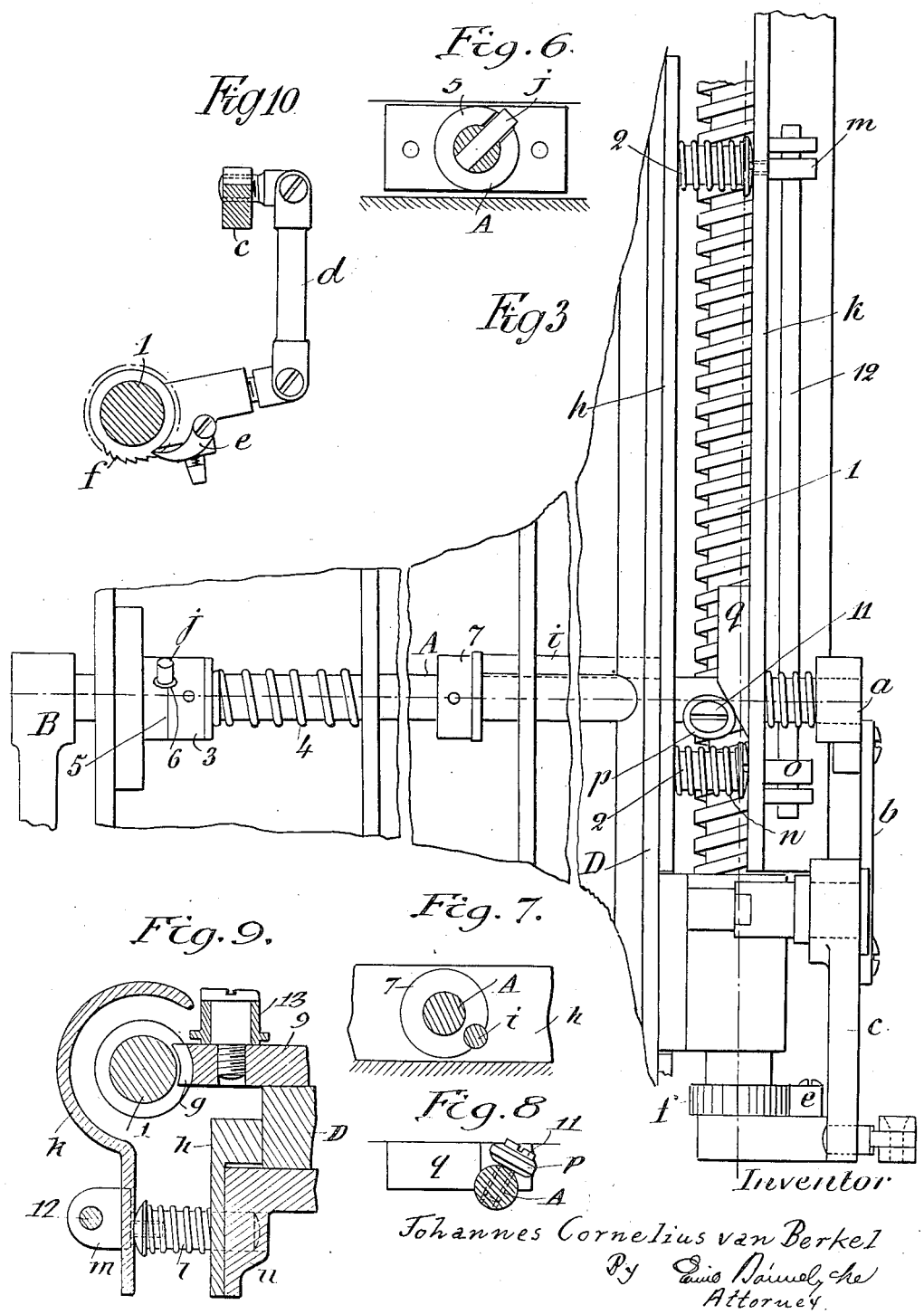

UNITED STATES PATENT OFFICE.

JOHANNES CORNELIUS VAN BERKEL, OF COPENHAGEN, DENMARK.

SLICING-MACHINE.

1,236,791. Specification of Letters Patent. Patented Aug. 14, 1917.

Application filed May 12, 1916. Serial No. 97,151.

*To all whom it may concern:*

Be it known that I, JOHANNES CORNELIUS VAN BERKEL, manufacturer, subject of the Queen of Holland, residing at Copenhagen, Denmark, No. 19 Visterbrogade, have invented certain new and useful Improvements in Slicing-Machines, of which the following is a specification.

The invention relates to improvements in slicing machines, by which the meat or the like to be sliced is clamped upon a meat plate mounted upon a carriage in front of a rotary knife, and is moved to and fro parallel to the front face of said knife, and which meat plate can be moved to and fro in the direction toward the knife; the movement of said meat plate toward the knife being performed by means of a threaded shaft engaging a half-nut fixed to the meat plate, while the meat plate, when not moved, is locked in position by means of a spring lock in form of a movable spring actuated plate mounted upon the carriage parallel to the edge of the meat plate and normally pressed toward the edge of the meat plate by its springs.

According to the invention the meat plate is advanced toward the knife by means of shaft mounted in the carriage and provided with a handle, which shaft before being rotated is first displaced lengthwise thereby pressing back the spring lock and releasing the meat shaft. The shaft, when rotated in one direction from its normal position, operates the threaded shaft to advance the meat plate toward the knife, while, when rotated in the opposite direction from its normal position, releases the half-nut from the threaded shaft, thereby releasing the meat plate from said shaft so that the meat plate may be moved freely to and fro.

This arrangement simplifies extremely the construction and mode of operation of the mechanism for moving the meat plate upon the carriage.

A constructional form of the invention is illustrated in the accompanying drawings, wherein—

Figure 1 is a plan view partially in section of parts of a slicing machine,

Fig. 2 is a side view of said parts,

Fig. 3 shows parts of the machine seen from below and on a greater scale,

Figs. 4 and 5 are side and plan views respectively of the half-nut and parts of the meat plate.

Figs. 6-10 show details.

D (Fig. 1) is the meat plate movably mounted upon the carriage $u$, which by known means is moved to and fro in front of the knife and parallel to the front face of said knife, which is not shown in the drawing. The meat plate is locked in the desired position by means of a spring lock, acting against one edge of the meat plate. Said lock consists of a plate $h$ parallel to the side edge of the meat plate and mounted on bolts 2 (Figs. 1, 3 and 9) fixed to the carriage $u$ and by means of springs $l$ and $n$ is pressed toward the edge of the meat plate. The carriage $u$ has bearings for a shaft A provided with a handle B, which shaft may be lengthwise displaced. Normally the shaft is pressed back toward the bearing 5 by means of a spring 4 (Fig. 3) acting on a ring 3 fixed to the shaft. A pin $j$ (Figs. 3 and 6) fixed to the shaft A projects through a notch 6, which is cut half in the bearing 5 and half in the ring 3. If therefore the shaft A by means of the handle B is to be rotated from normal position in the one or the other direction, it is necessary to first push forward the shaft against the resistance of the spring 4 until the pin $j$ leaves the notch-half 6 of the bearing 5.

To the shaft A is fixed a ring 7 (Figs. 3 and 7), which carries a bar $i$ parallel to the shaft, the bar $i$ does not interfere with the rotation of the shaft. When the shaft before its rotation is pushed forward for releasing the pin $j$ from the notch-half 6 of the bearing 5, said bar $i$ engages the locking plate $h$ and forces back said plate against the resistance of the springs $l$ and $n$, so that the meat plate D is released and may then be moved upon the carriage $u$ in the manner to be described.

The meat plate is advanced toward the knife, in the direction of the arrow S (Fig. 1) by means of the following arrangement:

The carriage $u$ has bearings for a threaded shaft 1 to one end of which is fixed a pinion $f$ (Figs. 1, 3 and 10) coacting with a pawl $e$, which by means of link and lever connection $a$, $b$, $c$, $d$ (see especially Fig. 2) is operated by the shaft A, when said shaft is rotated by means of the handle B. The arrangement is such, that the pawl $e$ only engages the teeth of the pinion $f$ and rotates said pinion and of course the threaded shaft 1, when the handle B is moved in one direction, while when the handle is moved in the opposite direction the pawl $e$ slides over the teeth of the pinion $f$ without turning said pinion. The movement of the threaded shaft 1 is transmitted to the meat plate D by means of a half-nut $g$ (Figs. 1, 4, 5 and 9) connected to said meat plate. The half-nut $g$ is integral with a plate 9 pivoted at 8 to the meat plate, and it is held in engagement with the threaded shaft 1 by means of a spring 10 acting on the plate 9 so that the meat plate D, when the shaft A by means of the handle B is turned in that direction in which the pawl $e$ engages the teeth of the pinion $f$, is advanced a corresponding distance toward the knife (in the direction of the arrow S, Fig. 1). When the meat plate is advanced the desired distance, the handle B is turned back to bring the pin $j$ opposite to the notch 6 of the bearing 5 and then released. Then the spring 4 returns the shaft A to initial position (Fig. 3), and of course the springs $l$ and $n$ can again press the locking plate $h$ toward the edge of the meat plate D and thereby lock it in its new position.

If it is desired to move quickly the meat plate D to or fro upon the carriage $u$ the half-nut $g$ is pushed out of engagement with the threaded shaft 1. This is done by the following means:

A pin 11 (Figs. 3 and 8) screwed into the shaft A carries a roller $p$, which when the handle B is moved in a direction opposite to that described above acts on the inclined edge of a plate $q$ attached to the lower part of a plate $k$ pivotally suspended on a bar 12 (Figs. 2, 3 and 9) mounted in eyes $m$ and $o$, which are screwed into the heads of the bolts 2. The upper half-cylindrical part of the plate $k$ embraces the threaded shaft 1 and has its lower edge opposite to a roller 13 (Figs. 4, 5 and 9) carried by the half-nut $g$. Now as the plate $q$ is pushed back by the roller $p$, said plate in turn pushes back the lower part of the plate $k$ thereby turning said latter plate on the bar 12, causing the plate $k$ to be pressed toward the roller 13 moving it away from the shaft 1, and releasing the nut $g$ from the threaded shaft 1. When this is done, the meat plate can be moved freely to or fro upon the carriage by the hand of the attendant. When the meat plate is brought into desired position the handle B is turned back to bring the pin $j$ opposite to the notch 6 of the bearing 5 and then released. The spring 4 will cause the shaft A to return to its initial position, and the locking plate $h$ will lock the meat plate and the spring 10 return the half-nut into engagement with the threaded shaft.

Claims:

1. In a meat slicing machine the combination of a carriage, a meat plate slidably mounted thereon, means for locking the meat plate in fixed position relatively to the carriage, a shaft on the carriage, means actuated by said shaft for releasing the locking means to unlock the plate, and means actuated by said shaft for advancing the meat plate.

2. In a meat slicing machine, the combination of a carriage, a meat-plate slidably mounted thereon, means for feeding the table, means for operating said feeding means upon the movement of said operating means in one direction, and means actuated upon the movement of said operating means in another direction for preventing the feeding means from moving the plate and permitting the plate to be moved freely by the operator.

3. In a meat slicing machine, the combination of a carriage, a meat-plate slidably mounted thereon, means for locking the plate against movement, a shaft on the carriage for feeding the plate, an operating shaft when moved in one direction adapted to actuate the feeding shaft for advancing the plate, means operated on the movement of said operating shaft for actuating the locking means to release the plate, and means actuated upon the movement of said operating shaft in an opposite direction for preventing the feeding shaft from moving the plate and permitting the plate to be moved freely by the operator.

4. In a meat slicing machine the combination of a carriage, a meat plate slidably mounted thereon, means for normally holding the meat plate in fixed position relatively to the carriage, a threaded shaft on the carriage, a nut attached to the meat plate and normally engaged by the threaded shaft, a shaft movable on said carriage, means to prevent rotation of said shaft prior to its initial movement, means operated by said shaft to unlock the meat plate on the initial movement of the shaft, and means actuated by said shaft when rotated for turning the threaded shaft and thereby advancing the plate.

5. In a meat slicing machine, the combination of a carriage, a meat plate slidably mounted thereon, a spring lock normally locking the meat plate in fixed position relatively to the carriage, a threaded shaft on the carriage, a nut attached to the meat plate and normally engaged by the threaded shaft, a lengthwise movable shaft mounted on the carriage, means to prevent rotation of said shaft prior to its lengthwise movement, means carried by said shaft to unlock the meat plate when the shaft is moved lengthwise, a pinion fixed on the threaded shaft, and means for turning said pinion from the lengthwise movable shaft when said shaft is turned.

6. In a meat slicing machine the combination of a carriage, a meat plate slidably mounted thereon, a spring lock normally locking the meat plate to the carriage, a threaded shaft on the carriage, a nut attached to the meat plate and normally engaged by the threaded shaft, a shaft provided with a handle and mounted to move lengthwise in bearings on the carriage, means to prevent rotation of said shaft prior to its lengthwise movement, means actuated by said shaft to unlock the meat plate when the shaft is moved lengthwise, means for returning the shaft to its initial position when the handle is released, and means for imparting motion to the threaded shaft from said shaft when rotated in one direction.

7. In a meat slicing machine the combination of a carriage, a meat plate slidably mounted thereon, a spring lock normally locking the meat plate to the carriage, a threaded shaft on the carriage, a half-nut attached to the meat plate and normally held in engagement with the threaded shaft, a shaft provided with a handle and mounted for lengthwise movement in bearings on the carriage, means to prevent rotation of said shaft prior to its lengthwise movement, means actuated by said shaft to unlock the meat plate when the shaft is moved lengthwise, means for returning the shaft to its initial position when the handle is released, means for transmitting the rotation of said shaft to the threaded shaft when the shaft is rotated in one direction, and means carried by the shaft to release the half-nut from the threaded shaft when the shaft is rotated in the opposite direction.

In testimony whereof I affix my signature.

JOHANNES CORNELIUS van BERKEL.